(12) United States Patent
Dickey

(10) Patent No.: US 10,516,272 B2
(45) Date of Patent: Dec. 24, 2019

(54) POWER CONTROL CURRENT SHARING CIRCUIT

(71) Applicant: Hamilton Sundstrand Corporation, Charlotte, NC (US)

(72) Inventor: John A. Dickey, Caledonia, IL (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 0 days.

(21) Appl. No.: 16/021,083

(22) Filed: Jun. 28, 2018

(65) Prior Publication Data

US 2018/0309302 A1    Oct. 25, 2018

Related U.S. Application Data

(62) Division of application No. 14/845,379, filed on Sep. 4, 2015, now Pat. No. 10,033,195.

(51) Int. Cl.

| H02J 7/36 | (2006.01) |
|---|---|
| H02J 4/00 | (2006.01) |
| H02M 3/28 | (2006.01) |
| H02J 1/10 | (2006.01) |

(52) U.S. Cl.
CPC ............... *H02J 4/00* (2013.01); *H02J 1/102* (2013.01); *H02M 3/285* (2013.01); *H02J 2001/106* (2013.01)

(58) Field of Classification Search
None
See application file for complete search history.

(56) References Cited

U.S. PATENT DOCUMENTS

| 5,742,193 A | * | 4/1998 | Colli | ................. H03K 4/00 327/108 |
|---|---|---|---|---|
| 6,724,227 B2 | * | 4/2004 | Imai | ............. H03K 17/04123 327/108 |
| 7,741,883 B2 | | 6/2010 | Fuller et al. | |
| 7,880,470 B2 | * | 2/2011 | Amanuma | ......... H03K 17/0412 324/415 |
| 8,350,415 B2 | | 1/2013 | Wakatsuki et al. | |
| 8,461,876 B2 | | 6/2013 | Kobayashi | |
| 10,033,195 B2 | * | 7/2018 | Dickey | ................. H02J 4/00 |
| 2015/0364922 A1 | * | 12/2015 | Dickey | ................. H02J 4/00 307/115 |

* cited by examiner

*Primary Examiner* — Long Nguyen
(74) *Attorney, Agent, or Firm* — Cantor Colburn LLP

(57) ABSTRACT

A load balancing circuit comprising a first power source, a first field effect transistor (FET) device having a drain terminal connected to the first power source and a source terminal connected to a first node, a first resistor connected to the first node and a second node, a load connected to the second node, a second FET device having a drain terminal connected to the first node and a source terminal connected to the second node, a third FET device having a collector terminal connected to a gate terminal of the first FET device and an emitter terminal connected to the second node, and a second resistor connected to a base terminal of the third FET device and the first node.

4 Claims, 2 Drawing Sheets

POWER CONTROL CURRENT SHARING CIRCUIT

CROSS-REFERENCE TO RELATED APPLICATIONS

This application is a divisional of U.S. patent application Ser. No. 14/845,379 filed Sep. 4, 2015, now U.S. Pat. No. 10,033,195, the disclosure of which is incorporated by reference herein in its entirety.

TECHNICAL FIELD

The present disclosure relates to electrical circuits, and particularly to an electrical circuit that includes power controllers arranged in parallel that control power for various loads.

BACKGROUND

Solid state power controllers (SSPC) often use power field effect transistor (FET) devices to switch line voltages that power loads. The FETs have maximum current and power dissipation ratings, and under some transient states, the current or power in the FETs may exceed the maximum current ratings and damage the FETs.

SUMMARY

According to an exemplary embodiment, a load balancing circuit comprising a first power source, a first field effect transistor (FET) device having a drain terminal connected to the first power source and a source terminal connected to a first node, a first resistor connected to the first node and a second node, a second resistor connected to the second node and a third node, a second FET device having a source terminal connected to the third node, a drain terminal connected to a load, and a gate terminal connected to a gate terminal of the first FET device, a third FET device having a drain terminal connected to the first node and a source terminal connected to the second node, a fourth FET device having a source terminal connected to the second node and a drain terminal connected to the third node, a first bipolar device having a collector terminal connected to a gate terminal of the first FET device and an emitter terminal connected to the second node, a second bipolar device having a collector terminal connected to a gate terminal of the second FET device and an emitter terminal connected to the second node, a third resistor connected to a base terminal of the first bipolar device and the first node, and a fourth resistor connected to a base terminal of the second bipolar device and the third node.

According to another exemplary embodiment, a load balancing circuit comprising a first power source, a first field effect transistor (FET) device having a drain terminal connected to the first power source and a source terminal connected to a first node, a first resistor connected to the first node and a second node, a load connected to the second node, a second FET device having a drain terminal connected to the first node and a source terminal connected to the second node, a third FET device having a collector terminal connected to a gate terminal of the first FET device and an emitter terminal connected to the second node, and a second resistor connected to a base terminal of the third FET device and the first node.

According to another exemplary embodiment, a system comprises a first power source, a load, a first load balancing switching circuit operative to control power distribution from the first power source to the load, a second load balancing switching circuit operative to control power distribution from the first power source to the load, a controller operative to control a state of the first switching circuit and a state of the second switching circuit.

BRIEF DESCRIPTION OF THE DRAWINGS

Exemplary embodiments and features of the present disclosure will now be described by way of example only, and with reference to FIGS. 1 to 2, of which.

DETAILED DESCRIPTION

When power controllers such as, for example, solid state power controllers (SSPCs) are connected in parallel to a load, a capacitive load inrush of current or an inductive load turn off may occur. During a capacitive load inrush, the field effect transistor (FET) devices in the SPPC may be driven into the linear region. During such an event, the capacitive load inrush current may exceed the rating of the FET devices, which may cause the most heavily loaded SSPC to trip to an off state or be damaged. The tolerances for FET devices in the linear region may vary amongst components, for example, gate threshold voltage tolerances variances in FET devices with similar specifications may result in one channel carrying a substantial portion of the load current. Such a condition may damage the FET device carrying the larger share of the load current.

The embodiments described herein allow the SPPC channels that are arranged in parallel to share the load during a turn on current inrush into a capacitive load and during an inductive turn off current collapse. In this regard, the SSPC channels are solid state power controllers arranged in parallel that each receive power from, for example, a common feed input. For example a circuit board may receive a substantial size 3 phase feed from a primary source and include a number of SSPC devices that can all be used individually for loads or combined together into groups to form various size load channels.

Figure 1:
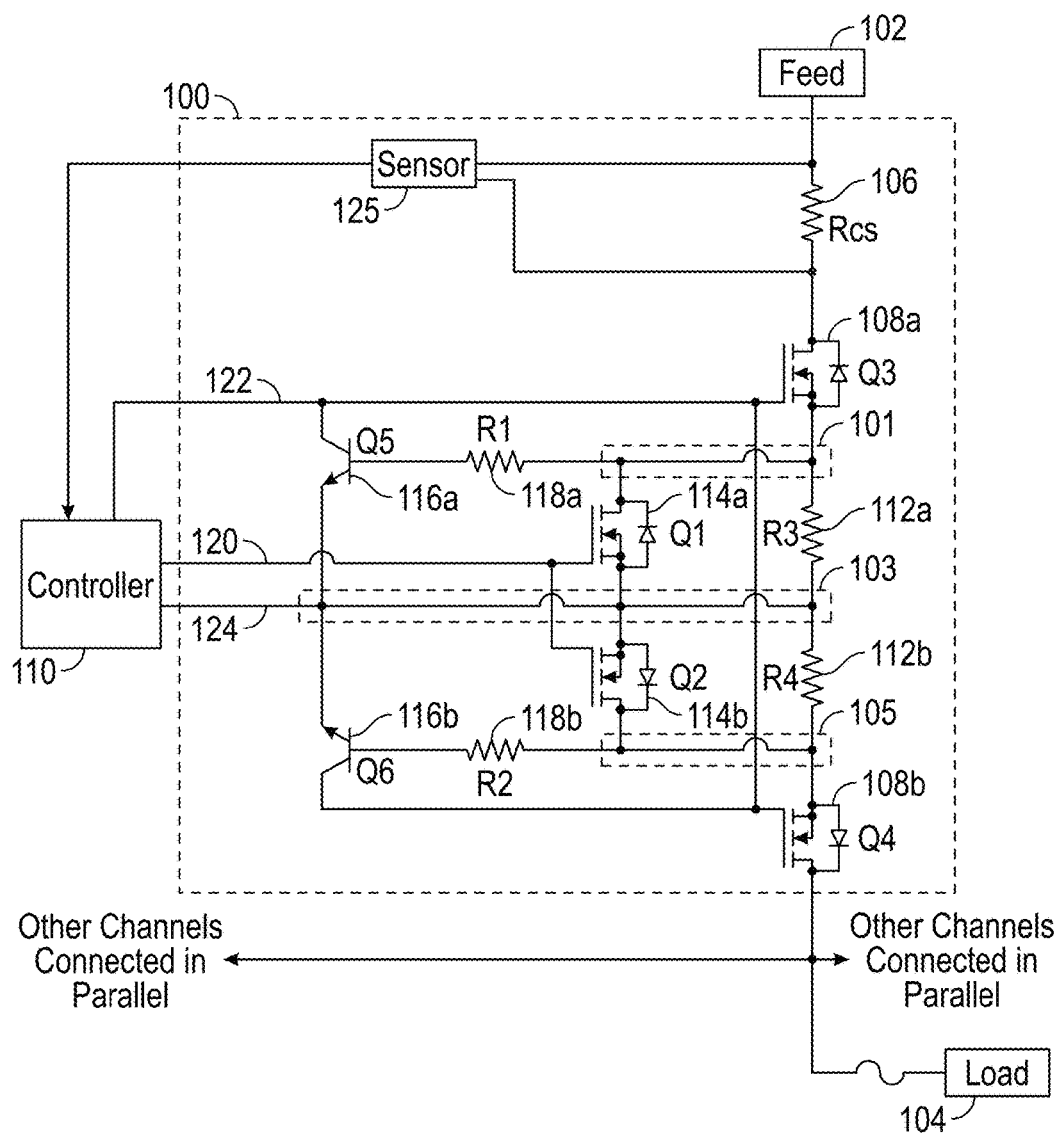
FIG. 1 illustrates a diagram of an exemplary embodiment of a circuit.

FIG. 1 illustrates a diagram of an exemplary circuit 100. The circuit 100 is configured to control alternating current (AC) power; alternate embodiments may be configured to control direct current (DC) power. The circuit 100 includes a power feed 102 and outputs power to a load 104. A sensor 125 is arranged to sense the current output by the power feed 102. A first FET device 108a has a drain terminal connected to the current sense resistor 106, a source terminal connected to a node 101, and a gate terminal connected to a controller 110. A first resistor 112a is connected to the node 101 and the node 103. A second resistor 112b is connected to the node 103 and a node 105. A second FET device 108a has a source terminal connected to the node 105, a drain terminal connected to the load 104, and a gate terminal connected to the controller 110. In the illustrated embodiment, the FET devices 108a and 108b include metal oxide semiconductor field effect transistor (MOSFET) type FET devices however; alternate embodiments may include other types of FET devices.

A third FET device 114a has a drain terminal connected to the node 101, a source terminal connected to the node 103, and a gate terminal connected to the controller 110. A fourth FET device 114b has a source terminal connected to the node 103, a drain terminal connected to the load 105, and a gate terminal connected to the controller 110. The FET devices 114a and 114b are relatively smaller, lower voltage FETs with a lower on resistance than the FET devices 108a and 108b. In the illustrated embodiment, the FET devices 114a and 114b include MOSFET type FET devices however; alternate embodiments may include other types of FET devices.

A first bipolar device 116a has a collector terminal connected to the controller 110, an emitter terminal connected to the node 103, and a base terminal connected to the node 101 via a third resistor 118a. A second bipolar device 116b has a collector terminal connected to the controller 110, a emitter terminal connected to the node 103, and a base terminal connected to the node 105 via a fourth resistor 118b. In the illustrated embodiment, the devices 116a and 116b are bipolar transistor type devices however; alternate embodiments may include other types of devices.

In operation, the circuit 100 forces sharing between SSPC channels arranged in parallel during a turn on current inrush into a capacitive load and during an inductive turn off current collapse. In this regard, during a capacitor load turn on during the positive half cycle, the controller output line 120 outputs a low voltage when or before the controller output line 122 outputs an ON signal. Thus, the FET devices 114a and 114b are off during the load turn on. When the controller 114 outputs an ON signal via the output line 122, the FET devices 108a and 108b are turned on and the current flows from the power feed 102 through the FET device 108a, through the resistors 112a and 112b and the FET device 108b to the load 104. The resistors 112a and 112b induce a voltage drop proportional to the load current. If the voltage drop exceeds the base emitter threshold of the device 116a, then the circuit 100 limits the current putting the FET device 108a into linear operation range. When the FET device 108a is operating in linear operation range, the voltage to the load is reduced, which causes other channels (i.e., circuits 100) arranged in parallel that may not be at the current limit point of the respective FET 108 devices to carry more of the current load. This results in balancing the load between parallel circuits 100 with the drops in the base emitter voltages of the devices 116 regulating the currents in the respective circuits 100. If all the channels 100 in parallel enter into the current limiting mode, then the voltage to the load will be reduced until either the load charges up the load capacitance or until the control unit 110 decides that the load is shorted and turns off all parallel channels 100. This allows the circuit to also help limit large surge transients from the source feeder 102. When the capacitive load is charged, the load current will drop to a steady state. Once the load is at steady state, the controller 110 outputs a high signal on the control line 120. The high signal on the control line 120 turns the FET devices 114a and 114b on such that the FET devices 114a and 114b conduct current, which effectively shorts the resistors 112a and 112b to reduce the steady state power dissipation The control line 124 is connected to node 103. The control line 124 is the reference for switching all of the devices on and off. When the channel 100 is off it substantially follows the negative half wave of the feed 102 due to the body diode of the FET device 108a. When the channel is ON then the control line 124 is connected to both the feed 102 and load 104 and follows the feed voltage throughout the full AC cycle. Since the control line 124 floats with the AC cycle, then the controller 110 either floats or level shifts the signals 120 and 122 to be relative to the control line 124. The controller 110 uses the sensor 125 input to determine when the inrush has reached steady state or whether there is a fault on the line instead of an inrush as the fault would grow in current load and the inrush would peak and decay.

During a turn off routine of an inductive load, the control line 120 is set by the controller 110 to an off or low state when or prior to setting the control line 122 to an off or low state. When the control line 120 is set an off or low state, the FET devices 114a and 114b turn off and the current flows through the resistors 112a and 112b. When the control line 122 is set to a low state, the FET devices 108a and 108b are set to off When the FET devices 108a and 108b are set to off, the inductive load drives the FET devices 108a and 108b into linear operation since the inductive load forces the load voltage to negative. The resistors 112a and 112b induce a voltage drop proportional to the channel current, and provides improved load sharing across the channels. The load 104 may include, for example, a protective clamp detection device that transfers an inductive voltage spike to the gates of the FET devices 108a and 108b.

Figure 2:
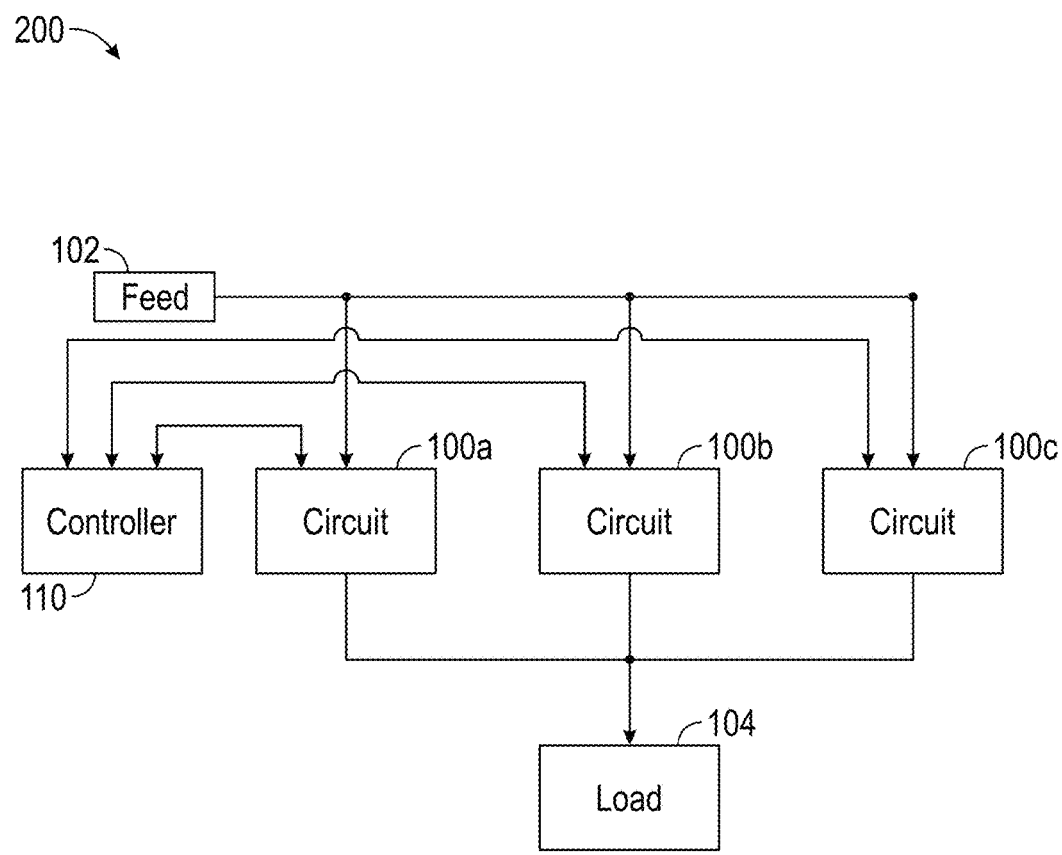
FIG. 2 a block diagram of an exemplary embodiment of a system with the circuit of FIG. 1.

FIG. 2 illustrates a block diagram of an exemplary system 200 that includes the circuit 100 described above. In this regard, the system 200 includes a power feed 102 that provides power to the circuits 100a, 100b, and 100c respectively. The controller 110 sends control signals and receives sensor signals to the circuits 100a, 100b, and 100c. The circuits 100a, 100b, and 100c provide power to the load 104 in parallel. The illustrated embodiment includes a single controller 110. However, alternate embodiments may include any number of controllers arranged or integrated to control the system 200 as described above.

The embodiments described above provide load balancing between channels arranged in parallel that provide power to a load. The balancing is operative to protect the switching circuits that control power distribution to the load.

Although the figures and the accompanying description describe particular embodiments, it is to be understood that the scope of this disclosure is not to be limited to such specific embodiments, and is, instead, to be determined by the scope of the following claims.

What is claimed is:

1. A system comprising:
a first power source;
a load;
a first load balancing switching circuit operative to control power distribution from the first power source to the load, the first load balancing circuit including:
a first field effect transistor (FET) device having a drain terminal connected to the first power source and a source terminal connected to a first node;
a first resistor connected to the first node and a second node, wherein the load is connected the second node;
a second FET device having a source terminal connected to the third node, a drain terminal connected to a load, and a gate terminal connected to a gate terminal of the first FET device;
a first bipolar device having a collector terminal connected to a gate terminal of the first FET device and an emitter terminal connected to the second node; and
a second resistor connected to a base terminal of the first bipolar device and the first node; and
a second load balancing switching circuit operative to control power distribution from the first power source to the load;
a controller operative to control a state of the first switching circuit and a state of the second switching circuit.

2. The system of claim 1, wherein the first load balancing switching circuit further comprises:
- a third resistor connected to the second node and a third node;
- a third FET device having a drain terminal connected to the first node and a source terminal connected to the second node;
- a fourth FET device having a source terminal connected to the second node and a drain terminal connected to the third node;
- a second bipolar device having a collector terminal connected to a gate terminal of the second FET device and an emitter terminal connected to the second node;
- a fourth resistor connected to a base terminal of the second bipolar device and the third node.

3. The system of claim 1, wherein the second load balancing switching circuit comprises:
- a second load balancing switching circuit first field effect transistor (FET) device having a drain terminal connected to the second power source and a source terminal connected to a second load balancing switching circuit first node;
- a second load balancing switching circuit first resistor connected to the second load balancing switching circuit first node and a second load balancing switching circuit second node;
- a second load balancing switching circuit second resistor connected to the second load balancing switching circuit second node and a second load balancing switching circuit third node;
- a second load balancing switching circuit second FET device having a source terminal connected to the second load balancing switching circuit third node, a drain terminal, and a gate terminal connected to a gate terminal of the second load balancing switching circuit first FET device;
- a second load balancing switching circuit third FET device having a drain terminal connected to the second load balancing switching circuit first node and a source terminal connected to the second load balancing switching circuit second node;
- a second load balancing switching circuit fourth FET device having a source terminal connected to the second load balancing switching circuit second node and a drain terminal connected to the second load balancing switching circuit third node;
- a second load balancing switching circuit first bipolar device having a collector terminal connected to a gate terminal of the second load balancing switching circuit first FET device and an emitter terminal connected to the second load balancing switching circuit second node;
- a second load balancing switching circuit second bipolar device having a collector terminal connected to a gate terminal of the second load balancing switching circuit second FET device and an emitter terminal connected to the second load balancing switching circuit second node;
- a third resistor connected to a base terminal of the second load balancing switching circuit first bipolar device and the second load balancing switching circuit first node; and
- a fourth resistor connected to a base terminal of the second load balancing switching circuit second bipolar device and the second load balancing switching circuit third node.

4. The system of claim 1, wherein the controller is operative to receive a signal indicating a current output by the first power source.

* * * * *